(12) United States Patent
Blank et al.

(10) Patent No.: US 8,039,170 B2
(45) Date of Patent: Oct. 18, 2011

(54) INTERNALLY GAS REGULATED FUEL CELL

(75) Inventors: Felix Blank, Constance (DE); Cosmas Heller, Friedrichshafen (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/068,750

(22) Filed: May 19, 2011

(65) Prior Publication Data

US 2011/0229779 A1    Sep. 22, 2011

Related U.S. Application Data

(62) Division of application No. 10/523,067, filed as application No. PCT/DE03/002201 on Jul. 2, 2003, now Pat. No. 7,972,748.

(30) Foreign Application Priority Data

Jul. 19, 2002    (DE) .................. 102 32 871

(51) Int. Cl.
*H01M 8/04* (2006.01)
*H01M 2/40* (2006.01)
*H01M 8/06* (2006.01)

(52) U.S. Cl. ......... 429/514; 429/408; 429/457; 429/458

(58) Field of Classification Search ............ 429/408, 429/456–459, 452, 507, 544–545, 512–514, 429/535; 27/115

See application file for complete search history.

(56) References Cited

U.S. PATENT DOCUMENTS

| | | | |
|---|---|---|---|
| 5,804,326 A | 9/1998 | Chow et al. | 429/26 |
| 6,245,453 B1 | 6/2001 | Iwase et al. | 429/34 |
| 6,294,278 B1 | 9/2001 | Wohr et al. | 429/24 |
| 6,461,754 B1 | 10/2002 | Zeng | 429/26 |
| 6,566,001 B2 | 5/2003 | Yosida et al. | 429/30 |
| 7,354,670 B2 | 4/2008 | Enjoji et al. | 429/22 |

(Continued)

FOREIGN PATENT DOCUMENTS

DE    690 14 155 T2    1/1991

(Continued)

OTHER PUBLICATIONS

Mizutani S. et al. ("Development of 1Kw Class PEFC Stack System with Function of Variable Gas Flow Channel", Proceedings of the Battery Symposium in Japan, vol. 1D17, Oct. 2, 2002, 519-519, XP008071986.).

(Continued)

*Primary Examiner* — Barbara Gilliam
*Assistant Examiner* — Claire L Roe
(74) *Attorney, Agent, or Firm* — Davidson, Davidson & Kappel, LLC

(57) ABSTRACT

A fuel cell includes a membrane electrode assembly (MEA) and at least one bipolar plate having an anode-side gas distributor structure for distributing anode reactants, a cathode-side gas distributor structure for distributing cathode reactants, and a guide passage structure for distributing a cooling medium. At least one of the anode-side gas distributor structure and the cathode-side gas distributor structure is divided into at least a first field and a second field, each of the first and second fields having an entry port and an exit port for the reactants. In addition, a method for such a fuel cell includes passing a reactant into an entry port of the first field and out of an exit port of the first field, mixing the reactant with a fresh reactant so as to form a mixture, and passing the mixture into the entry port of the second field.

12 Claims, 2 Drawing Sheets

U.S. PATENT DOCUMENTS

| | | | |
|---|---|---|---|
| 2002/0012827 A1 | 1/2002 | Mizuno et al. | 429/34 |
| 2003/0022052 A1 | 1/2003 | Kearl | 429/34 |
| 2004/0053105 A1 | 3/2004 | Blank et al. | 429/38 |

FOREIGN PATENT DOCUMENTS

| | | |
|---|---|---|
| DE | 197 43 067 | 4/1999 |
| DE | 100 55 253 | 5/2002 |
| EP | 0 405 088 | 11/1994 |
| EP | 1 009 050 | 6/2000 |
| EP | 1 109 241 | 6/2001 |
| JP | 06-068886 | 3/1994 |
| JP | 06-068896 | 3/1994 |
| JP | 6-119931 | 4/1994 |
| JP | 7-022059 | 1/1995 |
| JP | 10-284095 | 10/1998 |
| JP | 10284095 A | 10/1998 |
| JP | 11-312531 | 11/1999 |
| JP | 2000-012051 | 1/2000 |
| JP | 2000-082482 | 3/2000 |
| JP | 2000-090947 | 3/2000 |
| JP | 2001-043871 | 2/2001 |
| JP | 2001-143741 | 5/2001 |
| JP | 2001-506399 T | 5/2001 |
| JP | 2001-185172 | 7/2001 |
| JP | 2001-250568 | 9/2001 |
| JP | 2004-031135 | 1/2004 |

OTHER PUBLICATIONS

Translation in English of Mizutani S. et al. ("Development of 1 Kw Class PEFC Stack System with Function of Variable Gas Flow Channel", Proceedings of the Battery Symposium in Japan, vol. 1D17, Oct. 2, 2002, 519-519, XP008071986.).

INTERNALLY GAS REGULATED FUEL CELL

This is a divisional of U.S. patent Ser. No. 10/523,067, filed Jan. 19, 2005, which claims priority to German Patent Application No. DE 102 32 871.4, filed Jul. 19, 2002 through International Patent Application Serial No. PCT/DE2003/002201, filed Jul. 3, 2003, the disclosure of which are hereby incorporated by reference herein.

The invention relates to fuel cells, as are used, for example, for traction purposes in modern vehicles. In this context, groups of fuel cells are typically combined to form what are known as stacks.

BACKGROUND

To simplify and increase the efficiency of fuel cell stacks of this type, unhumidified or partially humidified fuel cells are often used at high operating temperatures and low pressures. This eliminates the outlay on equipment for gas/gas humidification devices or makes it possible to dispense with the radiator surface area required for the condensation. On account of the high operating and therefore cooling water temperatures of the fuel cell, the vehicle radiator can be reduced in size, and the compressor power can be reduced on account of the low operating pressure.

Under the operating conditions described, the problem of the electrolyte of the membrane electrode assembly (MEA) being (partially) dried out—particularly at the cathode entry—by the unsaturated gas entering it inevitably arises.

The prior art is represented by special arrangements of a plurality of fuel cell stacks through which the reactants (generally gases) flow in succession. The water formed by the cell reaction in the first stack is thus entrained by the reactants to the subsequent stacks. An arrangement of this nature is described, for example, in EP1009050, in which the cathode gas of a first (low-temperature) stack is supplied with a gas mixture made up of cathode gas from a second (high-temperature) stack and fresh air which is metered in. However, this only allows the moisture content to be adapted at the entry to the second stack. Since there are no additional gas mixing features in this arrangement, neither the moisture level nor the oxygen or hydrogen partial pressure can be set locally, i.e. for example for individual cells within a stack. The result of this is that the oxygen or hydrogen partial pressure is significantly (often 1.5 to 3 times) greater at the passage entry than at the exit. This leads to an inhomogeneous reaction distribution and the risk of local overheating (known as hot spots). Moreover, at either the cathode or anode entry there is a risk of drying out, or at the exit there is a risk of condensation and therefore of the supply of starting materials to the reactive zones of the MEA being impeded.

Another proposal for influencing the moisture distribution forms the subject matter of DE 100 55 253 A1. In this arrangement (illustrated in FIG. 1), the distributor plate (A) of a fuel cell has a channel region (B) with a plurality of parallel gas passages (C). These gas passages (C) run from a port region (D) which is used to supply gas to a port region (E) via which the gas is discharged. Connecting passages (F) run between the port region (D) and the gas passages (C). It is possible to locally meter fresh, unused gas from the port region (D) into the gas passages (C) via these connecting passages (F). On account of the cross section of the connecting passages (F) being reduced compared to the gas passages (C), the volumetric flow of the fresh gas stream is metered in such a manner that the local humidity which is present in the gas passage (C) is sufficient to prevent the MEA from drying out. Since the connecting passages (F) are connected to a common feed line port (D), influencing of the gas composition always affects the entire cell.

SUMMARY OF THE INVENTION

An object of the present invention is to provide a fuel cell in which it is possible to individually influence the gas composition in different regions of a cell.

The present invention provides a fuel cell including a membrane electrode assembly (MEA) and a bipolar plate. The bipolar plate includes an anode-side gas distributor structure for distributing anode reactants, a cathode-side gas distributor structure for distributing cathode reactants, and a guide passage structure for distributing a cooling medium. At least one of the anode-side gas distributor structure and the cathode-side gas distributor structure is divided into at least a first field and a second field, each of the first and second field having an entry port and an exit port for the reactants. In addition, the present invention provides a method for operating a fuel cell that includes passing a reactant into an entry port of the first field and out of an exit port of the first field, mixing the reactant with a fresh reactant so as to form a mixture, and passing the mixture into the entry port of the second field.

According to the invention, the problems described are solved with the aid of advantageous flow guidance via a plurality of fields within a fuel cell. A relatively minor and unsaturated gas stream is added to the cell at the cathode or anode entry. This gas stream, unlike in the prior art, may be smaller than the gas stream consumed over the overall active cell surface of the bipolar plate. On account of the small quantity of gas, little moisture is extracted from the MEA in the entry region. Moreover, the gas stream is more quickly humidified by the generation of product water in the cell or saturated with steam. To feed oxygen or hydrogen to the cell again, after it has passed through the first field of the gas distributor structure, the partially depleted anode or cathode gas is guided into a port outside the active cell surface, where it is mixed in a defined way with fresh gas and then passed on into a further field of the anode or cathode. The gas mixing advantageously takes place separately between anode and cathode gas stream and can be used a number of times along the gas passages of a bipolar plate. This allows the moisture content of the cathode or anode gases to be locally set and optimized.

BRIEF DESCRIPTION OF THE DRAWINGS

The invention is described in more detail below on the basis of a simple exemplary embodiment and with reference to the drawings, in which.

DETAILED DESCRIPTION

Figure 1:
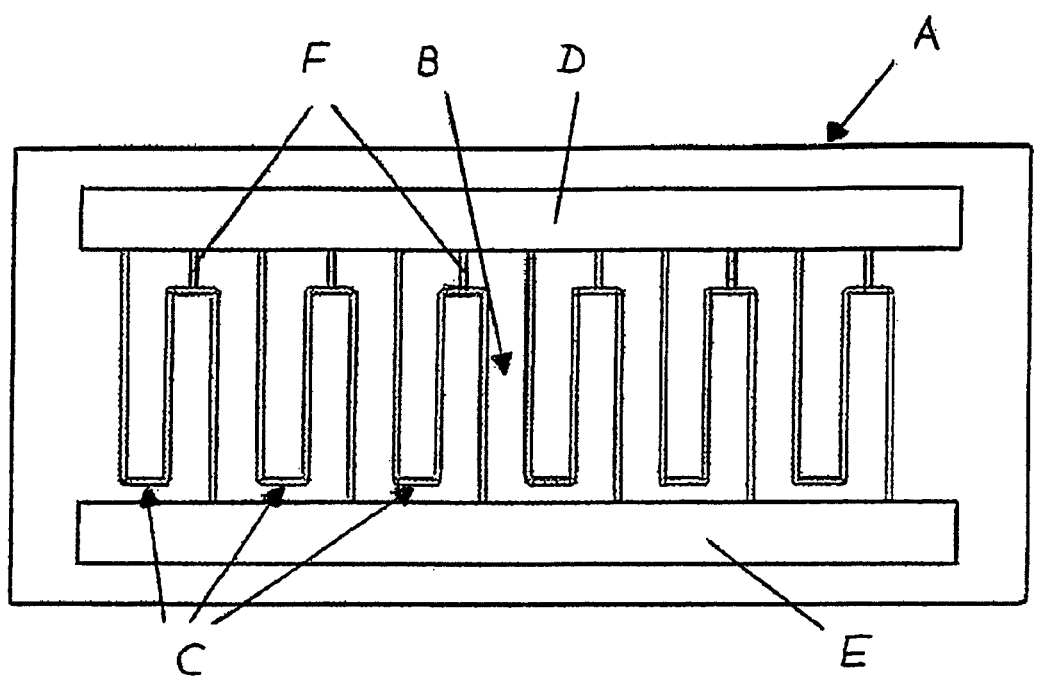
FIG. 1 shows a prior art version of distributor plate of a fuel cell.

In the context of the present invention, the term reactants is to be understood as meaning all substances which are involved in the electrochemical reaction, i.e. both starting materials, such as for example $H_2$ and $O_2$, and products, such as for example $H_2O$, as well as mixtures thereof.

The active cell surface (bipolar plate) is in this case—as the simplest variant—divided into just two fields (1, 2), with at least one anode-side and cathode-side gas distributor structure (not shown) being present in each field. The fresh cathode gas enters the first field (1) through an entry port (4a), is partially depleted in the first field as a result of the fuel cell process which takes place and is then passed into the exit port (4b) of the field (1). Either there or in the subsequent entry port (6a) of the following field, it is mixed with fresh gas via a regulatable inlet port (9). It is also possible for the latter two ports (4b, 6a) to be combined or for the supply of fresh gas to be carried out in a separate space. The gas mixture formed from depleted gas of the preceding field and the fresh gas then passes into the passage structure of the following field (2), where it is partially depleted by the fuel cell process taking place and is passed into the exit port (6b) of the field (2). Either the cathode gas then leaves the stack or further fresh gas enrichment takes place in the manner described above for subsequent fields, since in principle a plurality of fields are possible on the cathode side (not shown).

The gas supply to the anode may be analogous to the flow guidance and gas mixing on the cathode side as described above.

The fresh anode gas enters the first field (1) through an entry port (3a), is partially depleted in the first field as a result of the fuel cell process which takes place and is then passed into the exit port (3b) of the field (1). Either there or in the subsequent entry port (5a) of the following field (2), it is mixed with fresh gas via a regulatable inlet port (10). It is also possible for the latter two ports (3b, 5a) to be combined or for the supply of fresh gas to be carried out in a separate space. The gas mixture formed from depleted gas of the preceding field (1) and the fresh gas then passes into the passage structure of the following field (2), where it is once again partially depleted by the fuel cell process taking place and is passed into the exit port (5b) of the field (2). Either the anode gas then leaves the stack or further fresh gas enrichment takes place in the manner described above for subsequent fields. Therefore, a plurality of fields are also conceivable on the anode side.

If necessary, the anode and/or cathode of the field (2) or of other fields can be directly supplied exclusively with unused gas.

Furthermore, the gas streams of the individual fields can also be combined in such a way that the emerging cathode or anode gas streams of a plurality of fields, with or without fresh gas enrichment, are partially or completely passed into further fields. As a result, it is possible, for example, for fields at a lower temperature level to supply their emerging moist gas stream to fields which are at a higher temperature level and are therefore at a greater risk of drying out.

Figure 2:
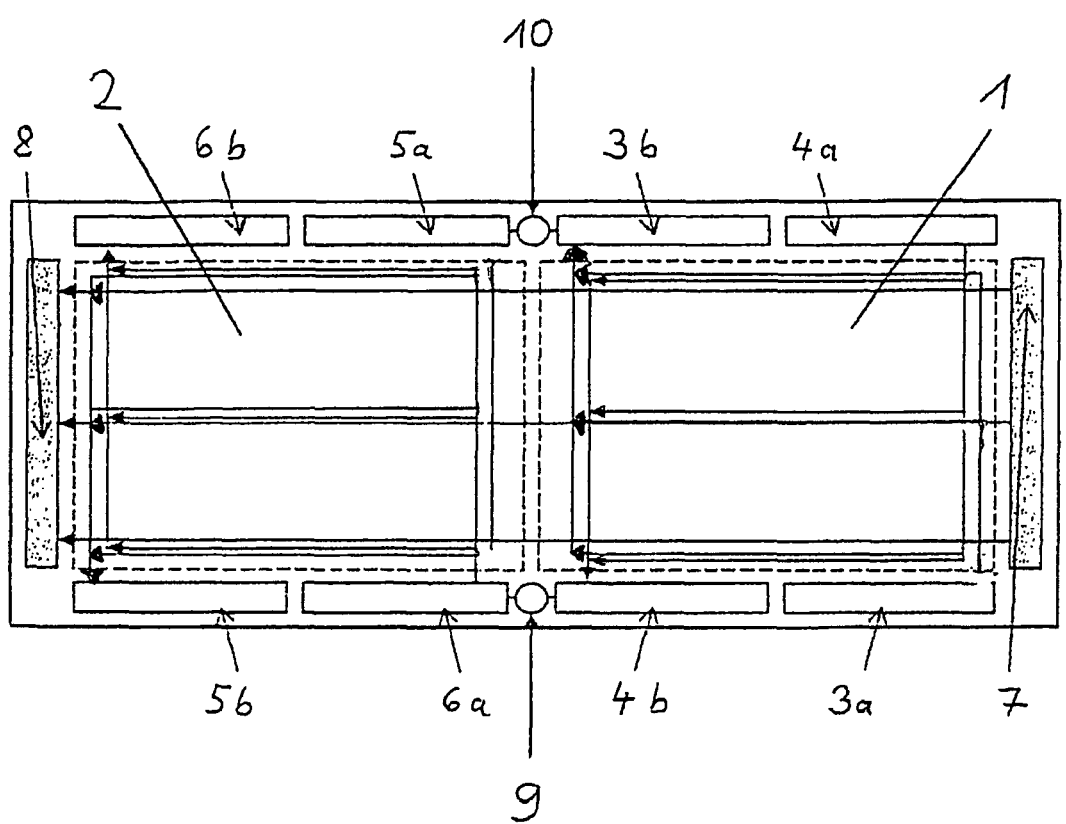
FIG. 2 shows a flowfield structure according to the invention of a cell having two fields and an associated arrangement of the ports for inlet and outlet of the reactants and the cooling medium.

With regard to the routing of the cooling medium, FIG. 2 merely provides one exit port (8) and one entry port (7) for all the fields of a cell. To provide more accurate control of the temperature of the individual fields, however, it is also possible for fields to be supplied using an additional entry and exit port for the cooling medium (not shown). In this case, analogously to what has been stated for the anode and cathode, the incoming and outgoing streams of cooling medium of the individual fields can be combined with one another. Analogously to what has been stated for anode and cathode, it is possible for streams of cooling medium of certain fields to be either combined or split and then completely or partially introduced into a further field.

By way of example, it is expedient to operate two fields with separate cooling medium ports in order there to keep the cell at a low temperature level. At these locations, unhumidified or relatively unhumidified operation of the cell would be possible. In a third field, the emerging, already warm cooling medium and the emerging cathode gas stream of the two colder fields would then be used. This has the advantage that in the third field, despite a higher cell temperature, the risk of drying out is reduced on account of the partially depleted but already humidified cathode gas from the upstream fields. The cooling medium which ultimately emerges from field 3 is then significantly hotter than if all three fields were to be supplied with an independent stream of cooling medium. The higher cooling medium temperature then reduces the size of the vehicle radiator for the same heat transfer capacity.

The passage structures which are diagrammatically depicted between the entry and exit ports represent just one possible configuration of the passage structure. In principle, serpentine-like, parallel, branched and/or studded structures are conceivable.

The fact that the invention divides the cell into a plurality of fields allows the humidity level and the oxygen and/or hydrogen content of the cathode and anode gases to be distributed uniformly over the entire cell area. This makes it possible to reduce or eliminate the drying-out phenomenon. In addition, by targeted admixing of gas, it is also possible to influence the reaction distribution in the cell, so that formation of local hot spots can be largely avoided. In an extended embodiment of the invention, the individual fields are for this purpose each equipped with temperature sensors. This allows the respective gas composition and/or the flow of coolant to be set to the optimum operating values as a function of the prevailing field temperature.

What is claimed is:

1. A method for operating a fuel cell including a bipolar plate having a guide passage structure for distributing a cooling medium, a cathode-side gas distributor structure for distributing cathode reactants, and an anode-side gas distributor structure for distributing anode reactants, at least one of the anode-side and cathode-side gas distributors being divided into a first field and a second field, the method comprising:

passing a reactant into an entry port of the first field and out of an exit port of the first field;

mixing the reactant with a fresh reactant so as to form a mixture; and passing the mixture into the entry port of the second field.

2. The method as recited in claim 1, wherein the reactant is a cathode reactant and the fresh reactant is a fresh cathode reactant.

3. The method as recited in claim 1, wherein the reactant is an anode reactant and the fresh reactant is a fresh anode reactant.

4. The method as recited in claim 1, wherein the first and second fields each include a cooling medium entry port and a cooling medium exit port for the cooling medium, the method further comprising:

mixing the cooling medium emerging from the cooling medium exit port of the first field with fresh cooling medium so as to form a cooling medium mixture; and feeding the cooling medium mixture to the cooling medium entry port of the second field.

5. The method as recited in claim 4, wherein the first field is operated using a first cooling medium and the second field is operating using a second cooling medium.

6. The method as recited in claim 4, wherein the first cooling medium includes a different substance that the second cooling medium.

7. The method as recited in claim 5, wherein the first cooling medium has at least one of a different temperature and a different flow velocity as compared to the second cooling medium.

8. The method as recited in claim 6, wherein mixture has property that differs from the reactant.

9. The method as recited in claim 8, wherein the property includes one of a composition and a flow rate.

10. The method as recited in claim 7, further comprising:
measuring a temperature of each of the first and second fields; and
using the temperature of each field to control the fuel cell by changing a property of at least one of the reactants and the cooling medium.

11. The method as recited in claim 10, wherein the property includes one of a flow rate and a composition.

12. A method for operating at least a first stack of fuel cells including a first bipolar plate and a second stack of fuel cells having a second bipolar plate, each bipolar plate having a guide passage structure for distributing a cooling medium, a cathode-side gas distributor structure for distributing cathode reactants, and an anode-side gas distributor structure for distributing anode reactants, at least one of the anode-side and cathode-side gas distributors being divided into a first field and a second field, the method comprising:
passing a reactant into an entry port of the first field and out of an exit port of the first field;
mixing the reactant with a fresh reactant so as to form a mixture; and
passing the mixture into the entry port of the second field, wherein at least one of the reactant and the cooling medium is passed from the second field of the first bipolar plate to the first field of the second bipolar plate.

* * * * *